United States Patent [19]

Perry

[11] Patent Number: 5,341,140
[45] Date of Patent: Aug. 23, 1994

[54] TRANSPONDER SYSTEM

[75] Inventor: Kenneth H. Perry, Maldon, United Kingdom

[73] Assignee: GEC-Marconi Limited, Stanmore, United Kingdom

[21] Appl. No.: 934,669

[22] PCT Filed: Jun. 13, 1991

[86] PCT. No.: PCT GB91/00952

§ 371 Date: Jan. 25, 1993

§ 102(e) Date: Jan. 25, 1993

[87] PCT Pub. No.: WO91/19997

PCT Pub. Date: Dec. 26, 1991

[30] Foreign Application Priority Data

Jun. 14, 1990 [GB] United Kingdom ............... 9013349.7

[51] Int. Cl.⁵ ............................. G01S 13/80
[52] U.S. Cl. ...................... 342/44; 342/50; 342/46
[58] Field of Search ................. 342/42, 44, 50, 46, 342/51, 357, 451, 453, 463

[56] References Cited

FOREIGN PATENT DOCUMENTS

WO8905460 6/1989 World Int. Prop. O. .

Primary Examiner—John B. Sotomayor
Attorney, Agent, or Firm—Lowe, Price, LeBlanc & Becker

[57] ABSTRACT

A transponder system comprising an interrogating source of HF electromagnetic radiation, and a plurality of transponders which each include a token reader unit to receive a removable token, e.g., a smart card, including onboard data processing capability. The transponders, or a group of transponders, are each arranged when interrogated to transmit a unique HF response modulated by information taken upon the token.

9 Claims, 2 Drawing Sheets

TRANSPONDER SYSTEM

BACKGROUND OF THE INVENTION

The invention relates to a transponder system for monitoring the locations of objects over relatively large distances.

It is an object of the invention to provide such a system which can be made available at relatively low cost and which is arranged so that each transponder can, in response to the receipt of an interrogating signal, transmit to a monitoring station a response peculiar to that transponder, or a group of transponders, and which response can be easily altered to take account of changing circumstances.

BRIEF SUMMARY OF THE INVENTION

It is envisaged that a particularly advantageous application of invention might be to the monitoring of licenced fishing vessels, or to the monitoring of arms equipment, e.g. missiles and tanks.

WO/89/05460, for example, discloses a transponder system comprising an interrogating source of H.F. electromagnetic radiation and a plurality of transponders. The present invention is characterized in that each transponder includes a token reader unit to receive a removable token including on board data processing capability, the transponders, or a group of transponders, each being arranged when interrogated to transmit a unique H.F. response modulated by information carried upon the token.

Because of the H.F. signals used, typically between 4 and 28 MHz, the system is operative over large distances, say up to 3500 Km. Because of the token reader unit and the nature of the token, the transponders themselves can be made at relatively low cost and the information carried upon the token can be easily changed.

In the case of the fishing vessel application mentioned above, each vessel licenced under the scheme would be required to have a transponder. A token, e.g. a smart card, would be bought as a licence by the vessels operator and, in addition to the information identifying the particular vessel, could also have other information such as whether the token has expired encoded onto the token and that information additionally could be used to modulate the response.

The token may be replaced when updating is required, but preferably the token reader unit includes token writing means and the interrogating source is operative to transmit information to be written onto the token. In this way updating can be accomplished remotely.

One disadvantage of an H.F. radar system is its poor positional resolution, which means that it can be difficult to locate an identified object with any greater accuracy than about 10 Km or so.

Preferably each transponder is operatively connected to navigational satellite receiving means and is arranged when interrogated to transmit information indicative of the position of the transponder.

In this way, the monitoring station can be provided with information on the precise location of a vehicle so equipped even if its location cannot be accurately found using a reflected radar signal.

BRIEF DESCRIPTION OF THE DRAWINGS

In order that the invention may be well understood, embodiments thereof will now be described with reference to the diagrammatic drawings, in which.

DETAILED DESCRIPTION OF THE INVENTION

It will be appreciated that the transponder systems of the present invention are broadly applicable to cases where it is designed to continuously monitor and communicate automatically with one or more of a large number of mobile locations.

As previously discussed, one particular application for the invention is for a fishing vessel monitoring system. Fishing vessels often operate in large numbers over a very large area of sea, making monitoring difficult. In certain cases, where licencing schemes are operating, it is often difficult to locate or enforce licences, but the present invention is intended to overcome this problem.

Figure 1:
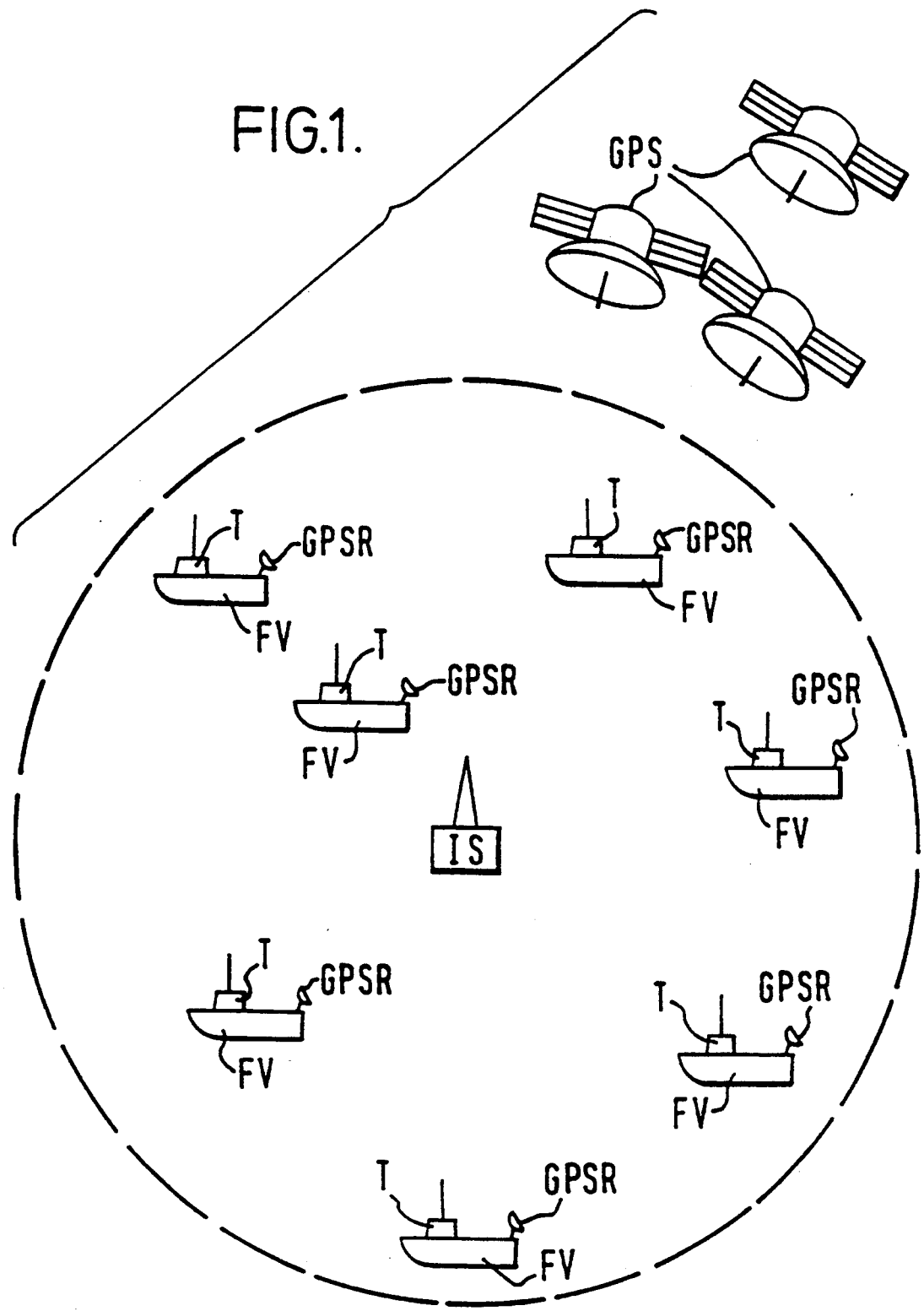
FIG. 1 shows a diagrammatic representation of a transponder system.

In FIG. 1 an interrogating and, optionally, monitoring station IS may be ship or shore mounted and arranged to transmit an H.F. radar interrogating signal. Each fishing vessel FV includes a transponder T having a token reader unit and a token, e.g. a smart card, containing a unique code, as will be described in greater detail later on. Each transponder T is also operatively connected to a navigational satellite receiver GPSR for receiving positional information from the GPS (Global Positioning System) satellite system operated by the US government. The term "GPS" is intended to encompass any satellite based navigational system.

Figure 2:
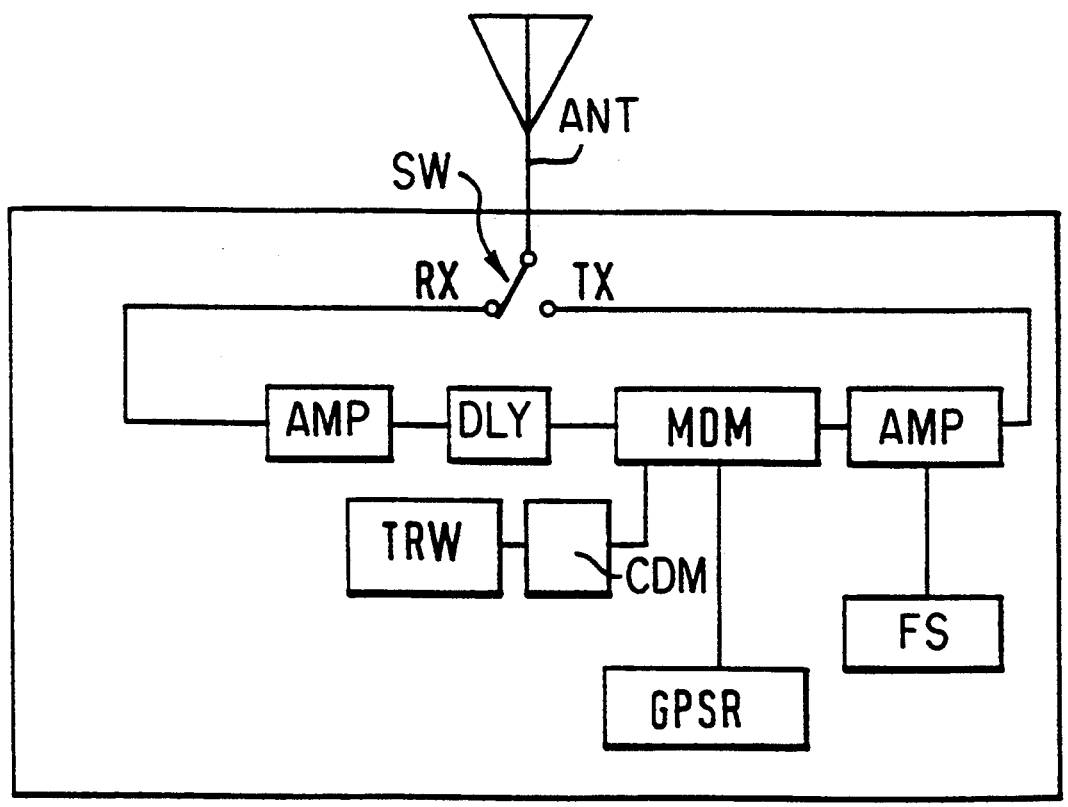
FIG. 2 shows a schemmatic view of a transponder unit for use in the system FIG. 1.

FIG. 2 shows schematically an HF radar transmitting transponder unit. An antenna Ant is operatively connected to the unit and typically may be 3 meters long. A switch SW, which may be electronic, switches the unit between a receive mode RX and a transmit mode TX. The unit includes amplifiers AMD, a frequency source FS, which may run at any suitable H.F. radar frequency depending on the range required. For the fisheries application previously mentioned, this may be between 4 and 8 MHz giving a range of up to 150 Km. Lower frequencies may be appropriate for longer ranges. Preferably the frequency is selected according to operational requirements, e.g. weather, sea state, size of vessel etc, and the transponder is arranged to respond to a range of signals. A modulator/demodulator MDM is present for decoding and coding message information from and onto the received and transmitted signals respectively. A delay unit DLY is also present. The transponder may be arranged to transmit only in response to the receipt of an interrogating signal intended for that particular unit. For example, the interrogating signal may include an identifying code to be compared with a code provided within the unit, e.g. held in coding means CDM, or on the token itself. A token reader and preferably also writer unit TRW is provided for reading and writing information from and onto a smart card, or other token having on board data processing capability. The smart card is conveniently a contactless smart card, e.g. of the type made by GEC Card Technology Limited of Walsall England, and which communicates with its reader/writer unit by inductive coupling. Such systems are robust and can be installed sealed in fishing vessels without problems of corrosion or damage in use. The coding means CDM is preferably provided both for checking, if appropriate, that a received identifying code is the correct code for that transponder unit to respond to and for checking, if appropriate, that the card is the correct card for that transponder to prevent unauthorised transfer of the card. The transponder unit is preferably operative to transmit an invalid response if the token is invalid for that transponder or is absent. The card can be issued, for the fisheries application mentioned above, on payment of the licence fee. In a preferred embodiment the transponder is arranged to write information onto the card in response to the receipt of an appropriate signal from the interrogating source. In such a case, when the life of the card has expired, but a new licence fee has been paid, the card can be updated remotely without the need for a new card to be issued. In addition to providing a code identifying each respective transponder, the information on the card can provide an indication of whether the card has expired. Information from the GPS received by the GPS receiver GPSR, indicative of the location of the transponder can also be encoded into the response so that the monitoring station knows precisely the location of the transponder. Such information could be processed within the transponder unit and, for example, compared with territorial limitations, or boundaries, encoded onto the card to check that the vessel has not strayed too far. As previously discussed, conventional H.F. radar has poor resolution and the implementation of such a system will enable a monitoring station to precisely locate vessels so equipped, even at great over-the-horizon distances.

One transponder which might be useful in constructing such a system is described in IEEE J. Oc Eng. Vol OE-6, No. 1 January 1981.

The transponder unit may be provided with further data input means for connection to a sensor or the like providing data to be transmitted to the monitoring station, and data output means, such as a display and/or actuator, for displaying data received or performing actions under the direction of the interrogating signal.

Where a number of transponders are interrogated, a time or frequency slot arrangement may be utilised, each transponder only transmitting for a given time in a predetermined slot or frequency.

An alternative use of the transponder system could be in monitoring the movement of aircraft over long distances. In particular the monitoring of aircraft over flying a region can be achieved as coding cards would only be issued by a given authority and hence unauthorised over flying can be detected and an authorised aircraft can be identified. Information about the aircrafts' route could be stored upon the token and relayed to the monitoring station. Similarly such transponder units could be fixed to items of arms equipment e.g. tanks and the like, and cards issued by the appropriate arms treaty invigilators.

I claim:

1. A transponder system comprising an interrogating source of H.F. electromagnetic radiation, and a plurality of transponders, wherein each includes a token reader unit to receive a removable token including on board data processing capability, the transponders, or a group of transponders, each being arranged when interrogated to transmit a unique H.F. response modulated by information carried upon the token.

2. A transponder system according to claim 1, wherein the token is a smart card.

3. A transponder system according to claim 1, wherein each transponder is operatively connected to a navigational satellite receiving means and is arranged when interrogated to transmit information indicative of the position of the transponder.

4. A transponder system according to claim 1, wherein the token reader unit additionally includes token writing means and in which the interrogating source is operative to transmit information to be written onto the token.

5. A transponder system according to claim 1, wherein each transponder is located upon a fishing vessel or other vehicle and in which the tokens comprise licences having a limited life.

6. A transponder system comprising an interrogating source of H.F. electromagnetic radiation and a plurality of transponders, each transponder including a token reader unit in communication with a removable token including on board data processing capability, said reader unit and token being in communication without physical contact, said transponders or a group thereof each being arranged when interrogated to transmit a unique H.F. response modulated by information carried upon its respective token.

7. The transponder system of claim 6 further comprising said interrogating source being operative to transmit a unique identifying code to each of said transponders whereupon said transponder transmits its said unique H.F. response.

8. The transponder system of claim 6 said information carried upon each token includes a code and each token reader unit in each transponder including a comparable reader code which it compares to said token code to determine whether the token is valid for that transponder.

9. The transponder system of claim 8 wherein said unique transmitted response is an invalid response when said reader unit code comparison indicates said token is invalid for said transponder or absent.

* * * * *